Sept. 2, 1969  F. C. HITZEROTH  3,464,586
BAIL HANDLE PIVOT MOUNT
Filed Nov. 12, 1968
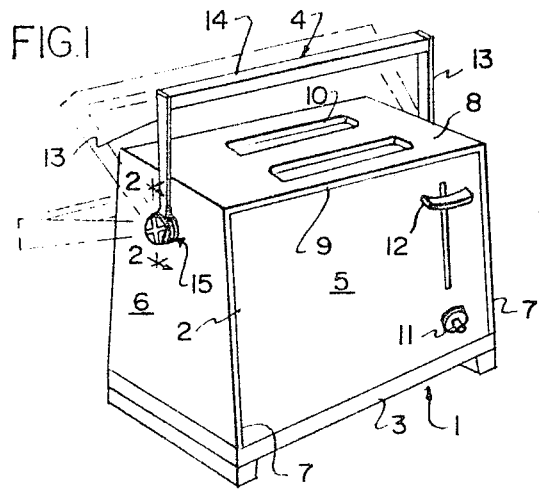
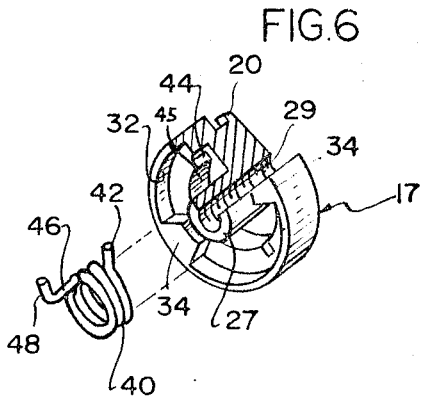
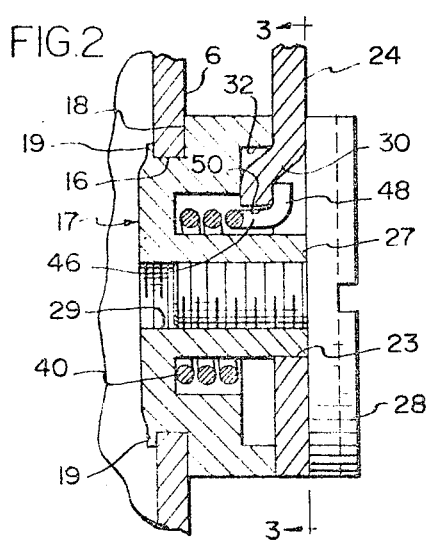
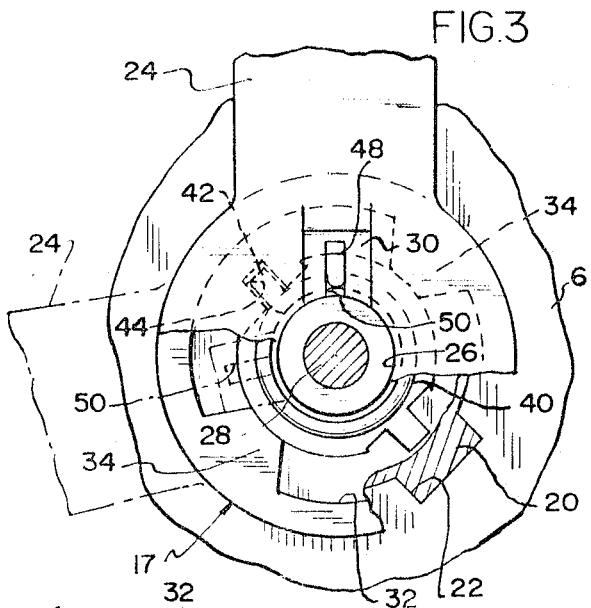
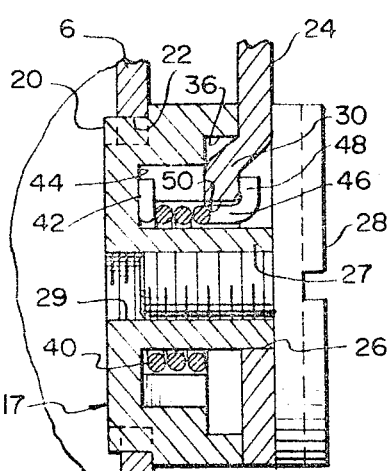
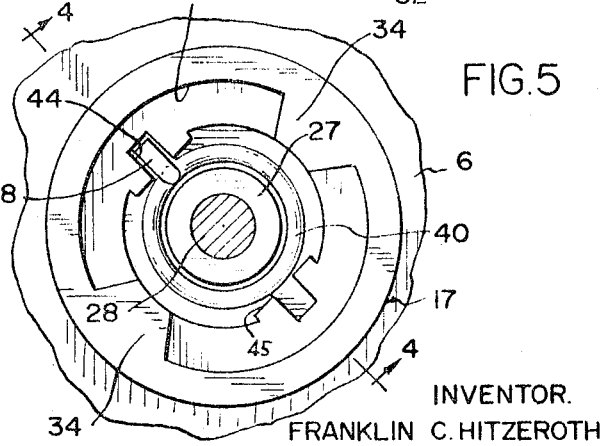
INVENTOR.
FRANKLIN C. HITZEROTH
BY Charles F. Lind ATTORNEY

# United States Patent Office 3,464,586
Patented Sept. 2, 1969

3,464,586
BAIL HANDLE PIVOT MOUNT
Franklin C. Hitzeroth, Centerville, Iowa, assignor to McGraw-Edison Company, Elgin, Ill., a corporation of Delaware
Filed Nov. 12, 1968, Ser. No. 775,057
Int. Cl. B65d 25/28
U.S. Cl. 220—94                                 10 Claims

ABSTRACT OF THE DISCLOSURE

A bail handle pivot connection to a case, particularly an electric toaster case, where a spring normally biases the handle to an inoperative horizontally oriented position out of heat receiving alignment with the toaster slots but where the handle can be moved upon overcoming the bias of the spring to an operative vertically oriented carrying position over the toaster slots.

---

This invention relates to a bail handle construction for an appliance case, particularly an electric toaster, where the bail handle can be pivoted between an inoperative position out of registry with the bread-receiving slots of the toaster and an operative carrying position overlying the slots, movement to the latter position being against the bias of a spring in the handle mounting means which normally maintains the handle in its inoperative position.

In many electric appliances, it is common to provide a bail type handle for easy carrying of the appliance. Most such appliances do not require that the bail handle be in any particular position when the appliance is in operation. Electric toasters conventionally have not used a bail handle, but the many advantages of having a bail handle on other appliances would also apply for a toaster. One problem in using a bail handle on a toaster is that the handle, in its normal carrying position, is in vertical orientation over the case, and thus is also over and in heat receiving alignment with the toaster slots. The handle could become excessively hot to the point of charring or certainly to the point where it would burn an individual who might grasp it if the toaster were operated with the handle accidentally left in this carrying position. Moreover, since bail handles generally pivot about a horizontal axis between vertical and slanted orientations there is generally a tendency for the handle, upon its release from the vertical carrying position, to drop by gravity where it might hit and possibly dent the case.

Accordingly, an object of this invention is to provide a handle that is normally maintained in an inoperative position out of vertical registry with the appliance case, particularly out of registry of the slots of the toaster to preclude accidental heating of the handle during the operation of the toaster.

A more specific object of this invention is to provide a bail handle construction, particularly for a toaster case, where the handle is normally biased by a spring to a slanted inoperative position not in registry with the toaster slots but which can be moved against the force of the spring to a carrying position in general vertical alignment over the toaster.

Another object of this invention is to provide a mounting mechanism for a bail handle where a spring element normally biases the handle toward a neutral slanted position between one vertically operative carrying position and a second slanted inoperative position as determined by engagement against spaced stops so that movement of the handle from the neutral position to either of these positions tensions the spring element and thereby, in effect, snubs handle impact against such stops.

These and other objects will be more fully appreciated and understood after reviewing the following specification, the accompanying drawings forming a part therein, wherein:

FIG. 1 is a perspective view of a toaster incorporating a preferred embodiment of the subject invention;

FIG. 2 is an enlarged section view as seen generally from line 2—2 of FIG. 1;

FIG. 3 is a view as seen generally from line 3—3 of FIG. 2;

FIGS. 4 and 5 are views corresponding to FIGS. 2 and 3, except showing the handle in the inoperative position shown in phantom in FIG. 1; and FIG. 6 is a perspective view of an insert used in the bail handle mounting means according to the subject invention.

While the invention is disclosed as applying to a toaster case, it can be equally adapted to other electrical appliances and in fact to other case constructions incorporating a bail handle. For this reason, the working mechanism of the toaster has not been disclosed since such is immaterial to the invention.

Referring to FIG 1, a preferred embodiment of the subject invention is disclosed in a typical electric toaster. The toaster 1 is formed with a case 2 having a pedestal 3 and a bail handle 4 pivoted to the case. The case 2, typically formed of stamped metal, includes opposed pairs of side walls 5 and 6 (only one each being shown) secured together along generally vertical corners 7, and a top wall 8 spans the side walls and is connected thereto along generally horizontal corners 9. Two parallel toaster slots 10 are located in the top wall 8 into which bread to be toasted is deposited. Typically, a temperature control knob 11 and a lift mechanism control handle 12, each connected to the working mechanism (not shown) inside the toaster, are exposed through the toaster wall and permit proper operation of the toaster. The handle has spaced side elements 13 and a connecting center element 14, and the pivot connection 15 between the case 2 and handle 4 is formed at the distal ends of the side elements.

Each case side wall 6 has an opening 16 (FIG. 2) formed therein which receives a bushing element 17, the bushing being held relative to the case by bushing shoulder 18 against the outside of the wall and by spaced stackings 19 formed from the bushing against the inside of the wall. A key 20 on the element is received within a complementary keyway 22 formed in the case wall as part of opening 16 to prevent rotation of the bushing relative to the wall. Each handle side element 13 has an opening 23 that is rotatably received over a boss 27 of the bushing 17, and headed bolt 28 threaded into a tapped core 29 of the boss maintains the side element on the boss. An offset tab 30 formed on the handle side element is received in a semicircular recess 32 in the bushing surrounding the boss 27. The opposite ends of the recess are defined by stops 34 and the offset tab 30 on the side element engages the stops 34 to limit handle movement, in one instance to the vertical carrying position (FIGS. 1, 2, and 3), and in another instance to an inoperative position shown in phantom in FIG. 1.

A coil spring 40 having a few turns is received in the recess loosely surrounding the boss 27, and a slight radial end extension 42 fits in and is retained in slot 44 formed in the bushing 17 between ribs 45. The opposite end of the coil has an axially disposed leg 46 and a radial extension 48 from this leg fits through slot 50 in the offset tab 30 and into groove 52 formed on the side element opposite the tab. The opposite ends 42 and 48 of the spring 40 are thus secured relative to the bushing 17 and to the handle side element 13 so that pivotal movement of the handle loads each spring in either a winding or unwinding fashion.

The bushings are symmetrical of one another about a plane through the key sections 20 so that two like semicircular recesses 32 and spring locking slots 44 are provided. The keyway opening 22 on the case is oriented at an angle relative to the top wall 8 of approximately one half the full intended swing of the handle, or approximately 57° for the disclosed toaster. This provides that the same bushing and spring components can be used on the two handle connections to the toaster, and it also orients the handle side elements approximately midway between engagement against the stops 34 when each spring 40 is unstrained and in its neutral position. Consequently, any movement of the handle from this neutral position tends to wind one spring in one bushing and tends to unwind the other spring in the opposite bushing. This loading of the springs upon movement of the handle from the neutral approximate midway position until the stops are engaged in either opposite extreme position tends to dampen or snub the impact of the handle against these stops. Of utmost importance also, upon releasing the handle from the operative vertical carrying position, the handle automatically is spring biased toward the neutral position of the springs and is then further biased by gravity past the neutral position against the force of the springs. The handle ultimately settles at a slanted position somewhere below or past the neutral position as determined by the balance of the handle weight, spring forces and whatever friction may be in the pivot connections 15.

The subject pivot connections 15 for the handle are capable of being economically fabricated and easily secured on an appliance case. Each connection is identical for both ends of the handle even though the handle pivots in opposite directions as related to the connections so that a minimum inventory of different components is required.

What is claimed is:

1. A bail handle construction for a case, comprising opposed bushings secured relative to opposed walls of the case and each having a boss thereon, means including openings on the handle aligned with the bosses operable to pivot the handle about an axis through the bosses relative to the case, one bushing having a recess, disposed circumferentially about the boss and having opposed surfaces radially of the boss, a coil spring loosely surrounding the one bushing boss, means maintaining the opposite ends of the spring respectively keyed relative to the one bushing and to the handle to provide that pivotal movement of the handle winds and/or unwinds the spring, a tab formed on the handle adjacent the one bushing and engageable with the respective opposed surfaces to limit in opposite senses the pivotal movement of the handle, and means orienting the one bushing relative to the case to provide that the neutral unstrained position of the spring corresponds approximately to the midway position of the handle as limited by abutment against the opposed surfaces.

2. A bail handle construction according to claim 1, wherein the one bushing fits within an opening on the side wall of the case, and wherein cooperating key and keyway means between the bushing and side wall properly orient the bushing and preclude rotation of the bushing relative to the case.

3. A bail handle construction according to claim 1, wherein the case is for a toaster and has a top wall including an open slot, wherein one extreme position of the handle as determined by the tab engaging one opposed surface generally overlies the top wall, and wherein the spring normally biases the handle from this one extreme position toward another position where the handle is not overlying the top wall and is not in alignment with the slot.

4. A bail handle construction according to claim 1, wherein the handle openings are received over the respective bosses for pivotally mounting the handle relative to the case.

5. A bail handle construction according to claim 4, wherein each boss is centrally tapped, and wherein a headed bolt is threaded into the tap and retains the handle relative to the boss.

6. A bail handle construction according to claim 1, wherein each bushing is identical and each includes two pairs of opposed surfaces set 180° apart relative to the pivotal axis, and wherein another spring is disposed in the other bushing recess and has its opposite ends keyed respectively to the other bushing and to the handle.

7. A bail handle construction according to claim 6, wherein each bushing is keyed to the case in such an oriented position that the neutral unstrained position of each spring occurs at the approximate same location of the handle, and wherein pivotal movement of the handle from this location simultaneously winds one spring and unwinds the other.

8. A bail handle construction for a toaster case, the case having a top wall with an open slot and the handle having an intermediate portion and two end portions, comprising to combination of opposed bushings secured relative to the opposed case walls, means including aligned openings on the end portions for mounting the handle to pivot about an axis through the bushing, each bushing having a recess open to the adjacent end portion and coil spring means disposed in each respective recess, means connecting the opposite ends of each spring means between the respective bushing and the adjacent end portion to provide that pivotal movement of the handle winds one spring means and unwinds the other spring means, engageable pairs of stop means between each end portion and the adjacent bushing operable when respectively engaged to limit in opposite senses the pivotal movement of the handle relative to the case, and means orienting each bushing relative to the case to provide that one pair of the stop means are engaged when the intermediate portion of the handle is vertically over the case top wall in general alignment with the open slot and that the neutral unstrained condition of each spring means corresponds approximately to the midway position of the handle as limited by engagement of the other pair of stop means.

9. A bail handle construction according to claim 8, wherein the other pair of stop means is disposed to be engaged when the handle is closely adjacent but spaced from the case.

10. A bail handle construction according to claim 9, wherein the intermediate portion of the handle, when the handle is in its midway position where the spring means are unstrained, is offset set horizontally of the bushings.

References Cited

UNITED STATES PATENTS

| 1,982,124 | 11/1934 | Smith | 220—95 |
| 2,254,506 | 9/1941 | Wheary | 16—126 |

FOREIGN PATENTS

| 331,378 | 7/1930 | Great Britain. |

RAPHAEL H. SCHARTZ, Primary Examiner